(12) United States Patent
Hsu et al.

(10) Patent No.: US 6,332,952 B1
(45) Date of Patent: Dec. 25, 2001

(54) TISSUE WITH STRIKETHROUGH RESISTANCE

(75) Inventors: Jay Chiehlung Hsu; Wesley James McConnell; Joseph Mitchell, all of Alpharetta, GA (US); Sheng-Hsin Hu, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/106,169

(22) Filed: Jun. 29, 1998

Related U.S. Application Data

(63) Continuation-in-part of application No. 08/638,522, filed on Apr. 26, 1996, now Pat. No. 6,027,611.

(51) Int. Cl.$^7$ .................. D21H 19/10; D21H 21/16
(52) U.S. Cl. .................. 162/127; 162/112; 162/129; 162/130; 162/132; 162/134; 162/135; 162/158
(58) Field of Search .................. 162/112, 125, 162/130, 127, 129, 158, 135, 132, 134

(56) References Cited

U.S. PATENT DOCUMENTS

| | | | |
|---|---|---|---|
| 3,093,342 | 6/1963 | Roberts, Jr. | 428/153 |
| 3,598,696 | 8/1971 | Beck | 162/298 |
| 3,695,985 | 10/1972 | Brock et al. | 428/198 |
| 3,953,638 | 4/1976 | Kemp | 428/154 |
| 4,075,382 | 2/1978 | Chapman et al. | 428/192 |
| 4,082,886 | 4/1978 | Butterworth et al. | 428/284 |
| 4,100,017 | 7/1978 | Flautt, Jr. | 162/111 |
| 4,113,911 | 9/1978 | LaFitte et al. | 428/284 |
| 4,145,464 | 3/1979 | McConnell et al. | 428/171 |
| 4,166,001 | 8/1979 | Dunning et al. | 162/111 |
| 4,196,245 | 4/1980 | Kitson et al. | 428/198 |
| 4,207,367 | 6/1980 | Baker, Jr. | 428/171 |
| 4,239,792 | 12/1980 | Ludwa | 428/198 |
| 4,287,251 | 9/1981 | King et al. | 428/198 |
| 4,298,649 | 11/1981 | Meitner | 428/198 |
| 4,326,000 | 4/1982 | Roberts, Jr. | 428/153 |
| 4,377,615 | 3/1983 | Suzuki et al. | 428/213 |
| 4,436,780 | 3/1984 | Hotchkiss et al. | 428/198 |
| 4,445,974 | 5/1984 | Stenberg | 162/300 |
| 4,469,735 | 9/1984 | Trokhan | 428/154 |
| 4,537,822 | 8/1985 | Nanri et al. | 428/212 |
| 4,548,856 | 10/1985 | Ali Khan et al. | 428/171 |
| 4,610,915 | 9/1986 | Crenshaw et al. | 428/219 |
| 4,618,524 | 10/1986 | Groitzsch et al. | 428/198 |
| 4,816,320 | 3/1989 | St. Cyr | 428/198 |
| 4,885,202 | 12/1989 | Lloyd et al. | 428/171 |
| 5,048,589 | 9/1991 | Cook et al. | 162/109 |
| 5,087,324 | 2/1992 | Awofeso et al. | 162/111 |
| 5,192,388 | 3/1993 | Schöllkopf et al. | 156/324 |
| 5,399,412 | 3/1995 | Sudall et al. | 428/153 |
| 5,403,392 | 4/1995 | Craig | 106/162 |
| 5,514,435 | 5/1996 | Suzuki et al. | 428/40 |
| 5,543,202 | 8/1996 | Clark et al. | 428/154 |
| 5,601,871 | 2/1997 | Krzyik et al. | 427/288 |
| 5,607,551 | 3/1997 | Farrington, Jr. et al. | 162/109 |
| 5,616,207 | 4/1997 | Sudall et al. | 156/246 |
| 5,620,565 | 4/1997 | Lazorisak et al. | 162/72 |
| 5,733,273 | 3/1998 | Ahr | 604/378 |

FOREIGN PATENT DOCUMENTS

| | | |
|---|---|---|
| 0144658 A1 | 5/1985 | (EP) . |
| 90/00363 | 1/1990 | (WO) . |
| 97/41301 | 11/1997 | (WO) . |
| 98/13549 | 4/1998 | (WO) . |

OTHER PUBLICATIONS

Kirk–Othmer; "Encyclopedia Of Chemical Technology", Third Edition, vol. 24, Vitamins To Zone Refining, 1985, pp. 442–451.

*Primary Examiner*—Peter Chin
(74) *Attorney, Agent, or Firm*—Scott B. Garrison; Dority & Manning, P.A.

(57) ABSTRACT

A toilet tissue product may include a first cellulosic ply and a second cellulosic ply. Desirably, the first cellulosic ply further includes a single layer and the second cellulosic ply further includes a single layer. At least one ply may have a region that prevents fluid from striking through the tissue product.

31 Claims, 5 Drawing Sheets

TISSUE WITH STRIKETHROUGH RESISTANCE

CROSS REFERENCE TO RELATED APPLICATIONS

This application is a continuation-in-part of U.S. patent application Ser. No. 08/638,522, filed Apr. 26, 1996 U.S. Pat. No. 6,027,611.

FIELD OF THE INVENTION

This invention generally relates to the field of paper making, and more specifically, to a tissue with strikethrough resistance.

BACKGROUND

During cleaning after urination the amount of tissue used may be highly variable, but generally about 12 to 15 tissue sheets are used per event for absorbing about 1 milliliter of urine. This tissue amount is about 14 times the actual amount needed based upon tissue's absorption capacity. Using this excessive tissue amount prevents urine from striking through the tissue sheet and reaching the user's hand. Unfortunately, this practice results in tissue waste, which expends economic and degrades environmental resources.

Accordingly, a tissue product that has strikethrough resistance may reduce tissue sheet use by allowing the utilization of the entire absorbency capacity of the tissue, thereby reducing tissue consumption rates and waste.

DEFINITIONS

As used herein, the term "repellant agent" refers to an agent that resists absorption of a liquid, desirably an aqueous liquid. The repellant agent may repel liquids by filling interstitial voids in the fibrous structure of a tissue or coating individual fibers preventing liquids from being absorbed by and passing through the fibers to the interior of the fibrous structure. The repellant agent may be hydrophobic and may include such materials as sizing agents, waxes, and latexes. Furthermore, the repellant agent may be any hydrophobic chemical, such as the agent sold under the trade name REACTOPAQUE by Sequa Chemicals, Inc. at One Sequa Dr., Chester, S.C. 29706. The amount of repellant agent added to the fibers may be from about 1 to about 30 pounds per ton of fiber, more specifically from about 1.2 to about 20 pounds per ton of fiber, and still more specifically, from about 2 to about 10 pounds per ton of fiber.

As used herein, the term "latex" refers to a colloidal water dispersion of high polymers from sources related to natural rubber, such as Hevea tree sap, or of synthetic high polymers that resemble natural rubber. Synthetic latexes may be made by emulsion polymerization techniques from styrene-butadiene copolymer, acrylate resins, polyvinyl acetate, and similar materials.

As used herein, the term "layer" refers to a single thickness, course, stratum, or fold that may lay or lie over or under another. An example of a several layered structure is depicted in FIG. 3, where a toilet tissue product 80 includes three layers 84, 86, and 88.

As used herein, the term "ply" refers to a material produced from a headbox having one or more layers. An exemplary toilet tissue product having two-ply structure is depicted in FIG. 1, where a product 10 includes two plies 22 and 26.

As used herein, the term "wax" refers to aqueous emulsions of small particles held in suspension by emulsifying agents and may include materials such as paraffin waxes, microcrystalline wax, or other waxes.

As used herein, the term "sizing agent" refers to any chemical inhibiting liquid penetration to cellulosic fiber structures. Suitable sizing agents are disclosed in a text entitled "Papermaking and Paper Board Making," second edition, Volume III, edited by R. G. MacDonald, and J. N. Franklin, which is herein incorporated by reference.

Sizing agents are commonly added to control the penetration of aqueous liquids into paper or other fibrous structures. In many cases, a certain resistance is required for end use. When surface treatments are applied with conventional equipment, such as sprayers or applicators, often sizing is required in the base sheet to control pickup of the aqueous solution. Paper grades such as butcher's wrap, milk carton, linerboard, bleached and unbleached bag, fine paper, cylinder board, and corrugated medium are routinely sized.

Internal sizing agents, which are those applied to the fibers within the paper structure, provide a reduced rate of penetration by retarding the rate of flow through the inter-fiber capillaries of the paper, as measured by test procedure ASTM D 779-94. When sizing is accomplished, the contact angle at the fiber surface is 90 degrees or greater, as measured by test procedure ASTM D 5725-95 or TAPPI Test Method T-458. Internal sizing agents function through the use of low surface energy, hydrophobic chemicals which when attached to the surface of cellulose reduce the surface energy of the fiber surface.

Particularly suitable sizing agents are acid or alkaline sizes such as acid rosin, alkenyl succinic anhydride, alkyl ketone dimers and alkenol ketene dimers of the formula:

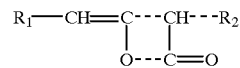

wherein $R_1$ and $R_2$ are based on $C_{16}$–$C_{18}$, aliphatic carbon chains, which can be the same or different. Exemplary commercially available sizing agents of this type are HERCON 79, HERCON 1332, and PRECIS 3000 from Hercules, Inc., 10 Wilmington, Del. The amount of the sizing agent added to the fibers may be from about 0.5 to about 10 pounds per ton of fiber, more specifically from about 1.0 to about 3 pounds per ton of fiber, and still more specifically, from about 2 to about 2.5 pounds per ton of fiber.

As used herein, the term "strikethrough prevention region" refers to an area in a tissue product treated with a repellant agent. The strikethrough prevention region impedes or stops the penetration of liquid from one side of the tissue product to the other. 20 As used herein, the term "cellulosic material" refers to material that may be prepared from cellulose fibers from synthetic source or natural sources, such as woody and non-woody plants. Woody plants include, for example, deciduous and coniferous trees. Non-woody plants include, for example, cotton, flax, esparto grass, milkweed, straw, jute, hemp, and bagasse. The cellulose fibers may be modified by various treatments such as, for example, thermal, chemical and/or mechanical treatments. It is contemplated that reconstituted and/or synthetic cellulose fibers may be used and/or blended with other cellulose fibers of the fibrous cellulosic material. Desirably, no synthetic fibers are woven into the cellulosic material fibers.

As used herein, the term "pulp" refers to cellulosic fibrous material from sources such as woody and non-woody plants. Woody plants include, for example, deciduous and coniferous trees. Non-woody plants include, for example, cotton, flax, esparto grass, milkweed, straw, jute, hemp, and bagasse. Pulp may be modified by various treatments such as, for example, thermal, chemical and/or mechanical treatments. Desirably, no synthetic fibers are woven into the pulp fibers.

As used herein, the term "bleached-chemical-thermo-mechanical pulp" refers to processing cellulosic material with steam, pressure and sodium sulfite or hydrogen peroxide to soften wood lignin between and within cell walls. Furthermore, alkaline peroxide bleaching is added to further soften and brighten the fibers. The term bleached-chemical-thermo-mechanical pulp may be hereinafter abbreviated as "BCTMP" and may be more hydrophobic than Kraft fiber.

As used herein, the term "sulfite pulp" refers to pulp processed chemically with a mixture of sulfurous acid and bisulfite ion. These chemicals attack and solubilize the lignin in the pulp feedstock. Sulfite pulp may be more hydrophobic than Kraft fiber.

As used herein, the term "basis weight" (hereinafter may be referred to as "BW") is the weight per unit area of a sample and may be reported as gram-force per meter squared. The basis weight may be measured using test procedure ASTM D 3776-96 or TAPPI Test Method T-220.

SUMMARY OF THE INVENTION

The problems and needs described above are addressed by the present invention, which provides a toilet tissue product that may include a first cellulosic ply and a second cellulosic ply. Each ply may further include a single layer. At least one ply may have a region that prevents fluid from striking through the tissue product. Furthermore, at least one ply may be treated with a repellant agent to create a region for preventing fluid strikethrough. Moreover, at least one ply may be printed and/or sprayed with a repellant agent. In addition, the repellant agent may be a sizing agent or hydrophobic chemical.

Another embodiment of a toilet tissue product may include a first cellulosic ply further having a first layer and a second layer and a second cellulosic ply further having a first layer and a second layer. The first layers of the plies may substantially sandwich the second layers of the plies, where at least one of the second layers may be resistant to fluid strikethrough. In addition, at least one of the second layers may include a repellant agent. Moreover, the repellant agent may be a wax, latex, hydrophobic chemical and/or sizing agent. Furthermore, the repellant agent may be printed onto at least one of the second layers. Additionally, the repellant agent may be sprayed onto at least one of the second layers. Also, the repellant agent may be mixed in with the fibers of at least one of the second layers in a headbox. Further, at least one of the second layers may include sulfite pulp or BCTMP.

Another embodiment of the present invention is a toilet tissue product not treated with a permanent wet strength binder, which may include a first cellulosic ply further including first, second, and third layers. The first and third layers may sandwich the second layer, which may be resistant to fluid strikethrough. In addition, the second layer may further include a repellant agent. Moreover, the repellant agent may be wax, latex, and/or a sizing agent. Furthermore, the repellant agent may be printed onto the second layer. Additionally, the repellant agent may be sprayed onto the second layer. Also, the repellant agent may be mixed in with the fibers of the second layer in a headbox. Further, the second layer may include sulfite pulp or BCTMP.

A further embodiment of the present invention is a toilet tissue product not treated with a permanent wet strength binder, which may include a first, second, and third cellulosic plies. The first and third plies may sandwich the second ply, which may be resistant to fluid strikethrough. In addition, the second ply may further include a repellant agent. Moreover, the repellant agent may be wax, latex, and/or a sizing agent. Furthermore, the repellant agent may be printed onto the second ply. Additionally, the repellant agent may be sprayed onto the second ply. Also, the repellant agent may be mixed in with the fibers of the second ply in a headbox. Further, the second ply may include sulfite pulp or BCTMP.

DETAILED DESCRIPTION OF THE PREFERRED EMBODIMENT(S)

Figure 1:
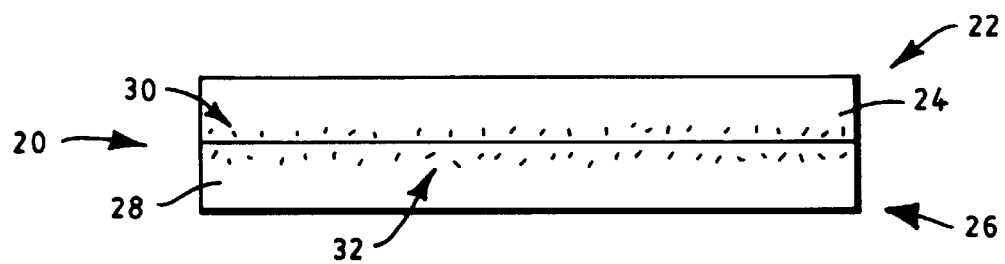
FIG. 1 is a magnified, but not necessarily to scale, side eleavational view of one embodiment of a toilet tissue product having a fluid strikethrough barrier.
Figure 2:
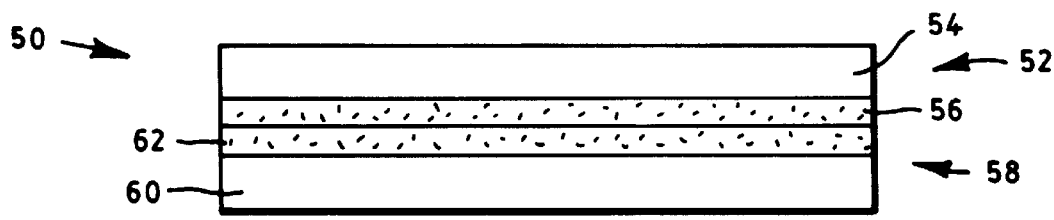
FIG. 2 is a magnified, but not necessarily to scale, side eleavational view of another embodiment of a toilet tissue product having a fluid strikethrough barrier.
Figure 3:
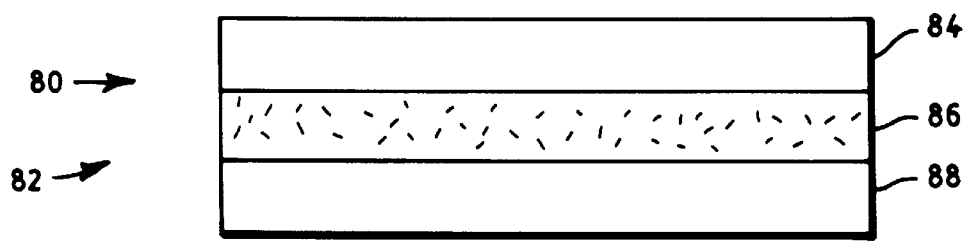
FIG. 3 is a magnified, but not necessarily to scale, side eleavational view of still another embodiment of a toilet tissue product having a fluid strikethrough barrier.

Referring now to the drawings, wherein like reference numerals designate corresponding structure throughout the views, and referring in particular to FIGS. 1–3, there are three embodiments of toilet tissue products 20, 50, and 80. The toilet tissue product 20 may include a first cellulosic ply 22 and a second cellulosic ply 26. The basis weight of the tissue product 20 may vary from about 8 gram-force per square meter (hereinafter may be abbreviated as "gsm") to about 59 gsm, desirably from about 17 gsm to about 34 gsm, and more desirably about 27 gsm. Each ply 22 and 26 may have a basis weight of about 4 gsm.

Desirably, each ply 22 and 26 includes, respectively, a single layer 24 and 28. The layer 24 may be treated with a repellant agent to form a first fluid strikethrough prevention region or barrier 30. Optionally, the layer 28 may be treated with a repellant agent to form a second fluid strikethrough prevention region or barrier 32. Desirably, a sizing agent is sprayed or applied to the layers 28 and 30 for creating, respectively, regions 30 and 32. Although the fluid strikethrough regions are shown in the interior of the tissue product 20, it should be understood that one or more strikethrough regions may be instead located on the exterior of the tissue product 20. Furthermore, a ply 22 or 26 may be formed with a repellant agent creating a strikethrough region as hereinafter described. The plies 22 and 26 may be formed from pulp fibers using any suitable papermaking techniques, and one such exemplary technique will be hereinafter described. The plies 22 and 26 may be bonded together using any suitable means, such as adhesives or pressure applied by a knurling or ply-bonding wheel. Exemplary bonding techniques are disclosed in U.S. Pat. Nos. 5,698,291, 5,622,734, and 5,543,202, which are hereby incorporated by reference. If a knurling wheel is utilized, desirably, only the edges of the plies 22 and 26 are bonded together.

The toilet tissue product 50 may include a first cellulosic ply 52 and a second cellulosic ply 58. The basis weight of the tissue product 50 may vary from about 8 gsm to about 59 gsm, desirably from about 17 gsm to about 34 gsm, and more desirably from about 27 gsm. Each ply 54 and 60 may have a basis weight of about 4 gsm.

Desirably, the ply 52 includes a first layer 54 and a second layer 56, and the ply 58 includes a first layer 60 and a second layer 62. The layer 56 may be treated with a repellant agent to prevent fluid strikethrough. The repellant agent, such as a sizing agent, may be sprayed or printed onto the layer 56, or alternatively, the repellant agent, such as a wax, latex, or hydrophobic chemical may be incorporated into the layer 56 during the papermaking process. Optionally, the layer 62 may be treated with a repellant agent to prevent fluid strikethrough. The repellant agent, such as a sizing agent, may be sprayed or printed onto the layer 62, or alternatively, the repellant agent, such as a wax or latex, may be incorporated into the layer 62 during the papermaking process. Additionally, a plurality of repellant agents may be used, which may be sprayed and/or incorporated into the layers 56 and/or 62.

The layers 54, 56, 60, and 62 may be formed using any suitable papermaking techniques, and one such exemplary technique will be hereinafter described. Desirably, the layers 54 and 56 are processed through a headbox to form the ply 52 and the layers 60 and 62 are processed through a headbox to form the ply 58. The plies 52 and 58 may be bonded together using any suitable means, such as adhesives or pressure applied by a knurling wheel. Exemplary bonding techniques are disclosed in U.S. Pat. Nos. 5,698,291, 5,622,734, and 5,543,202, which are hereby incorporated by reference. If a knurling wheel is utilized, desirably only the edges of the plies 52 and 58 are bonded together.

The toilet tissue product 80 may include a first cellulosic ply 82. The basis weight of the tissue product 80 may vary from about 8 gsm to about 59 gsm, desirably from about 17 gsm to about 34 gsm, and more desirably about 27 gsm. Desirably, the ply 82 includes a first layer 84, a second layer 86, and a third layer 88. The layer 86 may be treated with a repellant agent to prevent fluid strikethrough. The repellant agent, such as a sizing agent, may be sprayed onto the layer 86, or alternatively, the repellant agent, such as a wax, latex, or hydrophobic chemical may be incorporated into the layer 86 during the papermaking process. Additionally, a plurality of repellant agents may used, which may be sprayed and/or incorporated into the layer 86.

The layers 84, 86 and 88 may be formed using any suitable papermaking techniques, and one such exemplary technique will be hereinafter described. The layers 84, 86, and 88 may be processed through a headbox to form the ply 82. Alternatively, the toilet tissue product 80 may be formed from three single-layer plies corresponding to layers 84, 86, 88. The plies may be bonded together as previously described to form a three ply product 80 having a total of three layers.

Tissue products 20, 50, and 80 have regions providing strikethrough resistance that impede or slow the absorbency of fluid through the tissue. It should be understood that some pulps, such as sulfite pulp or BCTMP, have strikethrough resistance properties. Thus, these pulps may be used as a substitute to a repellant agent or as an aid for slowing absorbency. Furthermore, the toilet tissues 20, 50, and 80 of the present invention, unlike conventional facial tissues, ay not contain permanent wet strength binder materials. Wet strength binder materials may include polyamide-epichlorohydrin, polyacrylamides, styrenebutadiene latexes, insolubilized polyvinyl alcohol, urea-formaldehyde, polyethyleneimine, chitosan polymers, and mixtures thereof. Generally, it is undesirable to add permanent wet strength binder materials to toilet tissue because these materials impede the dissolution of the tissue in a toilet bowl.

Figure 4:
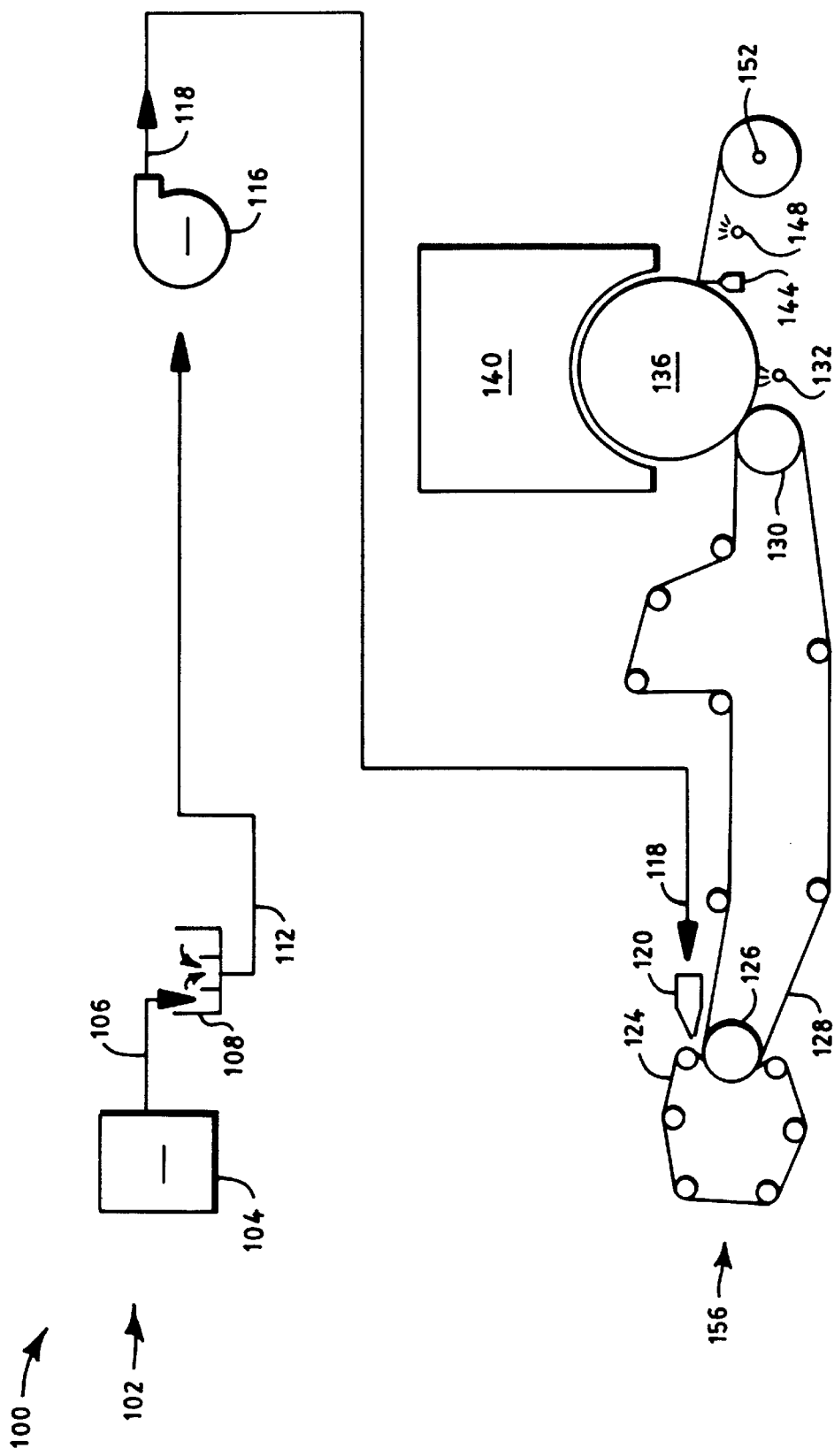
FIG. 4 is an illustration of an exemplary process for making a toilet tissue product.
Figure 5:
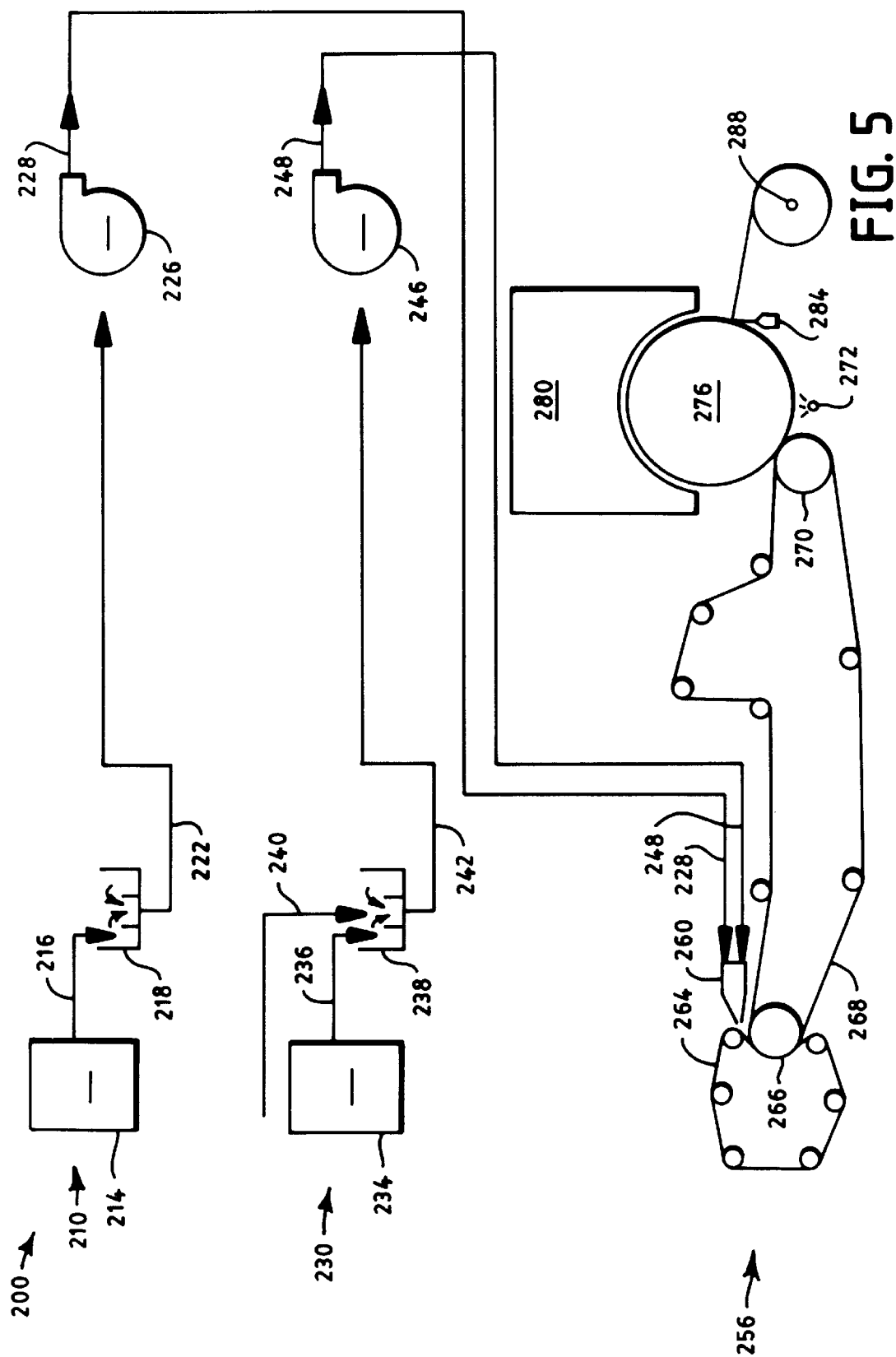
FIG. 5 is an illustration of another exemplary process for making a toilet tissue product.
Figure 6:
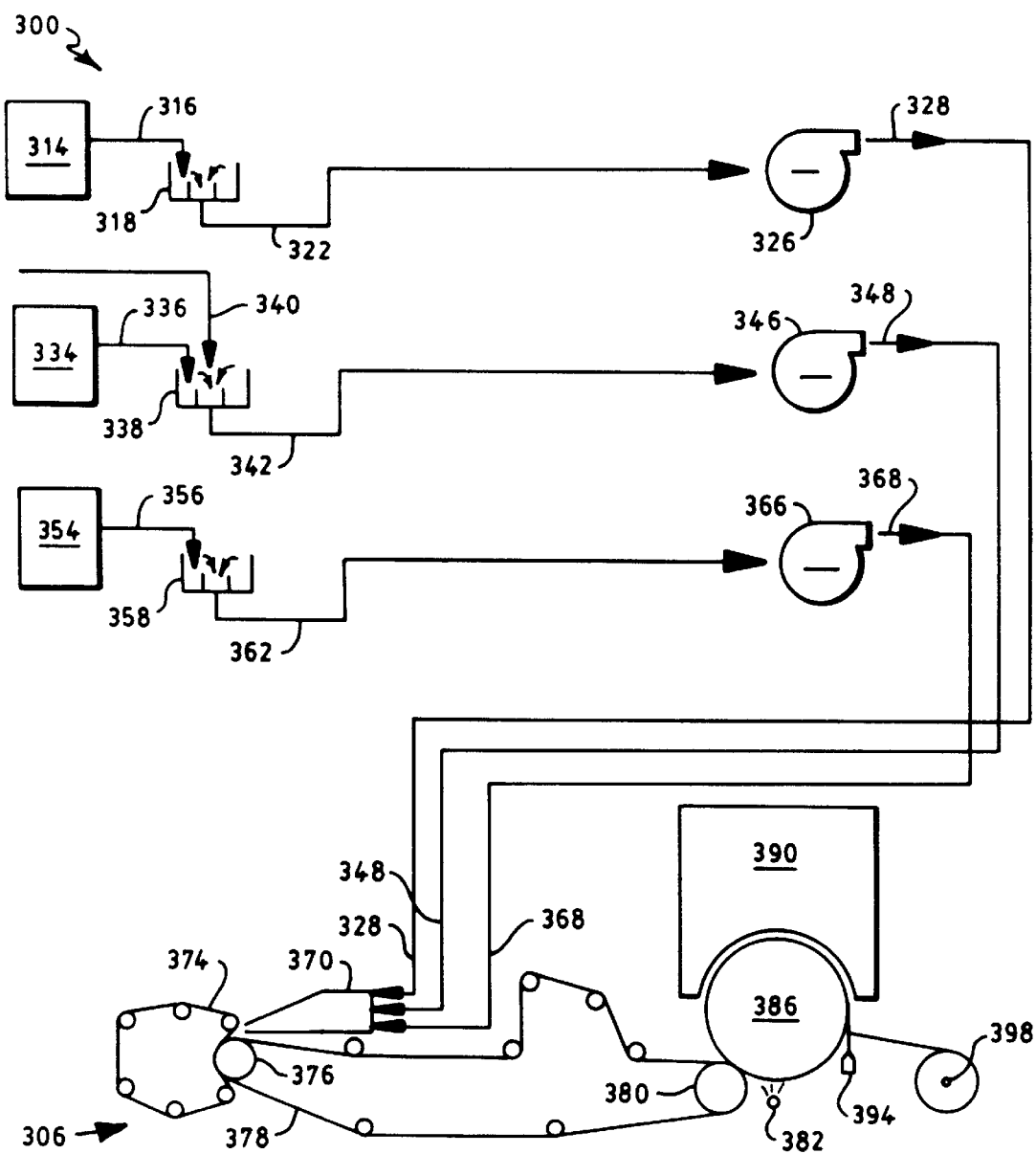
FIG. 6 is an illustration of still another exemplary process for making a toilet tissue product.

FIGS. 4–6 depict exemplary processes for forming, respectively, tissue products 20, 50, and 80. Although the hereinafter paper forming lines utilize creping, an uncreped paper forming line, such as those disclosed in U.S. Pat. Nos. 5,048,589 and 5,399,421, which are hereby incorporated by reference, may be used instead.

FIG. 4 depicts an exemplary process for forming the toilet tissue product 20, which may include a wet stock line 102 and a paper forming line 156. The wet stock line 102 may include a chest 104, a stuffbox 108, and a fan pump 116.

Desirably, the chest 104 stores an aqueous suspension of papermaking fibers, such as sulfite pulp or BCTMP, which is fed via a stream 106 to the stuffbox 108 for maintaining a constant pressure head. An outlet stream 112 of the stuffbox 108 may be sent to the fan pump 116. A discharge 118 from the fan pump 116 may be then sent to the paper forming line 156.

The paper forming line 156 may include a headbox 120, a forming fabric 124, a form roll 126, a press felt 128, a vacuum pressure roll 130, a Yankee dryer 136, an air hood 140, a doctor blade 144, and a core 152. Desirably, the headbox 120 receives the discharge 118 from the fan pump 116 and continuously injects or deposits the aqueous paper fiber suspension between the forming fabric 124 and the press felt 128, which is partially wrapped around the form roll 126. Water may be removed from the suspension through the forming fabric 124 by centrifugal force as the newly formed web traverses the arc of the form roll 126. Desirably, the wet web is dewatered to a consistency of about 12 dry weight percent prior to the vacuum pressure roll 130.

After the forming fabric 124 and the press felt 128 separate, the wet web may be transported on the press felt 128 to the vacuum pressure roll 130 where it may be pressed against the Yankee dryer 136 for drying.

An aqueous adhesive mixture may be sprayed evenly and continuously via a spray boom 132 onto the dryer surface of the Yankee dryer 136. The point of application onto the dryer surface may be between the blade 144 and the vacuum pressure roll 130. The adhesive mixture may aid in the adhesion of the web to the Yankee dryer 136, and thereby may enhance the crepe performance when removing the sheet from the dryer 136 via the blade 144. The creped tissue may be wound onto the core 152 in the reel section, which runs at a speed about 30% slower than the dryer 136. A repellant agent, such as a sizing agent, may be applied to the dry web by spraying an aqueous solution through the spray boom 148 located between the blade 144 and the core 152. Alternatively, the repellant agent may be sprayed or coated onto the moving tissue web prior to the pressure roll 130 or after the tissue web has transferred to the Yankee dryer 136.

FIG. 5 depicts an exemplary process 200 for forming a single ply of the toilet tissue product 50, such as the ply 52. The process 200 may include wet stock lines 210 and 230, and a paper forming line 256.

The wet stock line 210 may include a chest 214, a stuffbox 218, and a fan pump 216. The chest 214 may store an aqueous suspension of papermaking fibers, such as sulfite pulp or BCTMP, which may be fed via a stream 216 to the stuffbox 218 for maintaining a constant pressure head. An outlet stream 222 of the stuffbox 218 may be sent to the fan pump 226. A discharge 228 from the fan pump 226 may be then sent to the paper forming line 256.

The wet stock line 230 may include a chest 234, a stuffbox 238, and a fan pump 246. The chest 214 may store an aqueous suspension of papermaking fibers, which may be fed via a stream 236 to the stuffbox 238 for maintaining a constant pressure head. An amount of repellant agent 240, such as a wax, latex, hydrophobic chemical, and/or sizing agent, may be added to the stuffbox 238 for forming a pulp layer having fluid strikethrough prevention properties. An outlet stream 242 of the stuffbox 238 may be sent to the fan pump 246. A discharge 248 from the fan pump 246 may be then sent to the paper forming line 256.

Desirably, the paper forming line 256 includes a layered headbox 260, a forming fabric 264, a form roll 266, a press felt 268, a vacuum pressure roll 270, a Yankee dryer 276, an air hood 280, a doctor blade 284, and a core 288. The headbox 120 may receive the discharges 228 and 248 from the fan pumps 226 and 246, and may continuously inject or deposit the aqueous paper fiber suspensions between the forming fabric 264 and the press felt 268, which may be partially wrapped around the form roll 266. This deposition may form a two-layered slurry on the forming fabric 264. Water may be removed from the suspension through the forming fabric 264 by centrifugal force as the newly formed web traverses the arc of the form roll 266. The wet web may be dewatered to a consistency of about 12 dry weight percent prior to the vacuum pressure roll 270.

After the forming fabric 264 and the press felt 268 separate, the wet web may be transported on the press felt 268 to the vacuum pressure roll 270 where it may be pressed against the Yankee dryer 276 for drying. Generally, high temperatures may aid in the curing of the repellant agent.

Desirably, an aqueous adhesive mixture is sprayed evenly and continuously via a spray boom 272 onto the dryer surface of the Yankee dryer 276. The point of application onto the dryer surface may be between the blade 284 and the vacuum pressure roll 270. The adhesive mixture may aid in the adhesion of the web to the Yankee dryer 276, and thereby may enhance the crepe performance when removing the sheet from the dryer 276 via the blade 284. Desirably, the creped tissue is wound onto the core 288 in the reel section which runs at a speed about 30% slower than the dryer 276. The wound tissue may be in the form of a single ply having two layers, such as the ply 52.

Optionally, a repellant agent, such as a sizing agent, may be sprayed or coated between the blade 284 and the core 288, onto the moving tissue web prior to the pressure roll 270, and/or after the tissue web has transferred to the Yankee dryer 276.

A second ply, such as ply 58, may be made in a similar fashion as depicted in FIG. 5. The tissue product 50 may be created by ply bonding plies 52 and 58, using any suitable means such as adhesives or pressure, with the ply 58 being orientated in a mirror relation with the ply 52, thereby sandwiching second layers 56 and 62 with the first layers 54 and 60 and forming a palindromic structure.

FIG. 6 depicts an exemplary process 300 for forming a single ply of the toilet tissue product 80, such as the ply 82. The process 300 may include wet stock lines 310, 330, and 350, and a paper forming line 306.

The wet stock line 310 may include a chest 314, a stuffbox 318, and a fan pump 328. Desirably, the chest 314 stores an aqueous suspension of papermaking fibers, which is fed via a stream 316 to the stuffbox 318 for maintaining a constant pressure head. An outlet stream 322 of the stuffbox 318 may be sent to the fan pump 326. A discharge 328 from the fan pump 326 may be then sent to the paper forming line 306.

The wet stock line 330 may include a chest 334, a stuffbox 338, and a fan pump 346. Desirably, the chest 314 stores an aqueous suspension of papermaking fibers, such as sulfite pulp or BCTMP, which is fed via a stream 336 to the stuffbox 338 for maintaining a constant pressure head. An amount of repellant agent 340, such as a wax, latex, hydrophobic chemical, and/or sizing agent, may be added to the stuffbox 338 for forming a pulp layer having fluid strikethrough prevention properties. An outlet stream 342 of the stuffbox 338 may be sent to the fan pump 346. Desirably, a discharge 348 from the fan pump 346 is then sent to the paper forming line 306.

The wet stock line 350 may include a chest 354, a stuffbox 358, and a fan pump 368. The chest 354 may store an aqueous suspension of papermaking fibers, which is fed via a stream 356 to the stuffbox 358 for maintaining a constant pressure head. An outlet stream 362 of the stuffbox 358 may be sent to the fan pump 366. A discharge 368 from the fan pump 366 may be then sent to the paper forming line 306.

The paper forming line 306 may include a layered headbox 370, a forming fabric 374, a form roll 376, a press felt 378, a vacuum pressure roll 380, a Yankee dryer 386, an air hood 390, a doctor blade 394, and a core 398. Desirably, the headbox 370 receives the discharges 328, 348, and 368 from the fan pumps 326, 346, and 366, and continuously injects or deposits the aqueous paper fiber suspensions between the forming fabric 374 and the press felt 378, which is partially wrapped around the form roll 376. This deposition may form a three-layered slurry on the forming fabric 374. Water may be removed from the suspension through the forming fabric 374 by centrifugal force as the newly formed web traverses the arc of the form roll 376. Desirably, the wet web is dewatered to a consistency of about 12 dry weight percent prior to the vacuum pressure roll 380.

After the forming fabric 376 and the press felt 378 separate, desirably, the wet web is transported on the press felt 378 to the vacuum pressure roll 380 where it is pressed against the Yankee dryer 386 for drying. Generally, high temperatures aid in the curing of the repellant agent.

An aqueous adhesive mixture may be sprayed evenly and continuously via a spray boom 382 onto the dryer surface of the Yankee dryer 386. The point of application onto the dryer surface may be between the blade 294 and the vacuum pressure roll 380. Desirably, the adhesive mixture aids in the adhesion of the web to the Yankee dryer 386, and thereby enhances the crepe performance when removing the sheet from the dryer 386 via the blade 394. The creped tissue may be wound onto the core 398 in the reel section, which may run at a speed about 30% slower than the dryer 386. The wound tissue may be in the form of a single ply having three layers, such as the ply 82.

TESTING

A test measuring resistance to strikethrough was conducted by comparing a control tissue roll to three rolls produced by the present invention. Female subjects were asked to compare the strikethrough resistance of the four rolls after urination.

All rolls were formed from a refined recycled fiber furnish. Each roll contained two plies. Each ply had a basis weight of about 14 grams per square meter (gsm). The rolls of the present invention were treated with 0.12 weight percent per ply of a sizing agent, namely HERCON 79.

The first roll was the control. The second roll was printed or coated with the sizing agent. The third roll was sprayed with the sizing agent after the forming box and prior to web transfer. The fourth roll was formed with sizing agent metered into the top layer. Each ply had a top layer with sizing and a basis weight of about 5 gsm and a lower layer without sizing and a basis weight of about 8 gsm.

Figure 7:
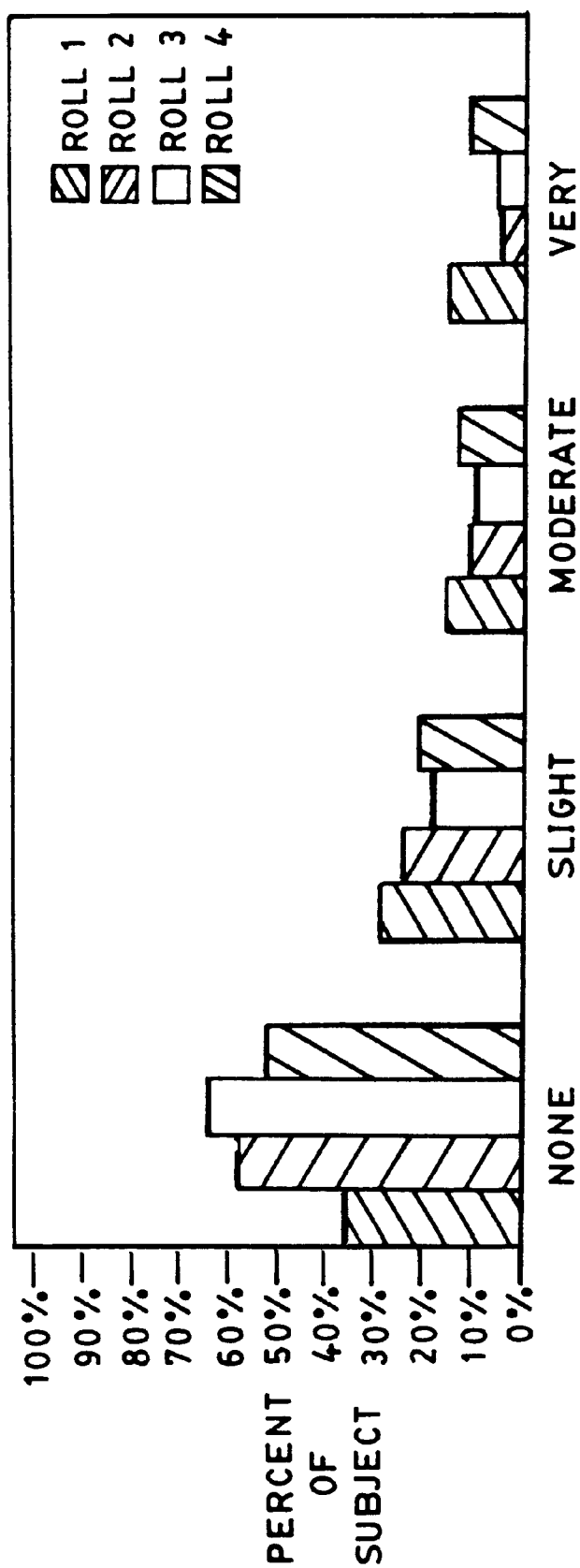
FIG. 7 graphically compares subjects' perception of fluid strikethrough for a control tissue roll and three tissue rolls of the present invention.

The testing procedure involved fifty-three subjects. Each subject randomly evaluated each tissue product. Subjects were instructed to pull four complete bath tissue sheets off a tested roll and use the tissue according to their normal practice. Afterwards, the subjects evaluated the ability of fluid to strikethrough the tissue sheet. Results are depicted in FIG. 7.

As depicted, rolls 2, 3, and 4 of the present invention were more likely to be perceived as having no strikethrough than the control roll, roll 1. Over fifty percent of the subjects perceived no fluid strikethrough for rolls 2, 3, and 4, while only about 30 percent of the subjects perceived no strikethrough for roll 1. As a result, the rolls of the present invention were perceived as more likely to prevent fluid strikethrough than the control roll.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A toilet tissue product, comprising:
    a first cellulosic ply further comprising a single layer;
    a second cellulosic ply further comprising a single layer; and
    at least one ply having a region that minimizes fluid strikethrough, wherein the region is situated at an exterior surface of the tissue product when the first and second plies are overlaid one atop the other, wherein the tissue does not contain permanent wet strength binder materials, and wherein the region comprises a uniform coating of dried liquid repellent agent.

2. The toilet tissue-product of claim 1, wherein the repellent agent is printed onto the at least one ply.

3. The toilet tissue product of claim 1, wherein the repellent agent is a sizing agent.

4. The toilet tissue product of claim 1, wherein the repellent agent is a hydrophobic chemical.

5. The toilet tissue product of claim 1, wherein the first cellulosic ply further comprises a second layer, and the second cellulosic ply further comprises a second layer wherein the first layers of the plies are substantially sandwiched by the second layers of the plies, and wherein the at least one treated ply comprises at least one of the second layers so that the region resistant to fluid strikethrough is situated at the exterior surface of the tissue product.

6. The toilet tissue product of claim 5, wherein the repellent agent is wax.

7. The toilet tissue product of claim 5, wherein the repellent agent is a sizing agent.

8. The toilet tissue product of claim 5, wherein the repellent agent is a hydrophobic chemical.

9. The toilet tissue product of claim 5, wherein the repellent agent is printed onto at least one of the second layers.

10. The toilet tissue product of claim 5, wherein at least one of the second layers comprise sulfite pulp.

11. The toilet tissue product of claim 5, wherein at least one of the second layers comprise bleached-chemical-thermo-mechanical pulp.

12. A toilet tissue product comprising:
    a first cellulosic ply having at least one layer; and
    a second cellulosic ply having at least one layer, wherein at least one exterior surface of the toilet tissue has a region that comprises a uniform coating of dried liquid repellent agent for minimizing fluid strikethrough, wherein the toilet tissue does not contain permanent wet strength binder materials.

13. The toilet tissue product of claim 12, further comprising a third cellulosic ply having at least one layer, wherein the second cellulosic ply is sandwiched between the first and third cellulosic plies.

14. The toilet tissue product of claim 12, wherein any of the first and second cellulosic plies comprise a plurality of individual layers.

15. The toilet tissue product of claim 13, wherein any of the first, second, and third cellulosic plies comprise a plurality of individual layers.

16. A method of producing a toilet tissue product comprising the steps of:
    providing a first cellulosic ply further comprising a single layer;
    providing a second cellulosic ply further comprising a single layer;
    treating at least one ply with a liquid application repellent agent to create a region that minimizes fluid strikethrough; and
    overlaying the first and second plies one atop the other so that the region is situated at an exterior surface of the tissue product, and the tissue product does not contain permanent wet strength binder materials.

17. The method as set forth in claim 16, wherein the repellent agent is printed onto the at least one ply.

18. The method as set forth in claim 16, wherein the repellent agent is a sizing agent.

19. The method as set forth in claim 16, wherein the repellent agent is a hydrophobic chemical.

20. The method as set forth in claim 16, wherein the first cellulosic ply further comprises a second layer, and the second cellulosic ply further comprises a second layer wherein the first layers of the plies are substantially sandwiched by the second layers of the plies, and wherein the at least one treated ply comprises at least one of the second layers so that the region resistant to fluid strikethrough is situated at the exterior surface of the tissue product.

21. The method as set forth in claim 20, wherein the repellent agent is wax.

22. The method as set forth in claim 20, wherein the repellent agent is latex.

23. The method as set forth in claim 20, wherein the repellent agent is a sizing agent.

24. The method as set forth in claim 20, wherein the repellent agent is a hydrophobic chemical.

25. The method as set forth in claim 20, wherein the repellent agent is printed onto at least one of the second layers.

26. The method as set forth in claim 20, wherein at least one of the second layers comprise sulfite pulp.

27. The method as set forth in claim 20, wherein at least one of the second layers comprise bleached-chemical-thermo-mechanical pulp.

28. A method of producing a toilet tissue product comprising the steps of:
  providing a first cellulosic ply having at least one layer;
  providing a second cellulosic ply having at least one layer;
  joining the first cellulosic ply with the second cellulosic ply; and
  treating the exterior surface of the toilet tissue with a liquid application repellent agent for minimizing fluid strikethrough, wherein the toilet tissue does not contain permanent wet strength binder materials.

29. The method as set forth in claim 28, further comprising:
  providing a third cellulosic ply having at least one layer; and
  sandwiching the second cellulosic ply between the first and second cellulosic plies.

30. The method as set forth in claim 28, wherein any of the first and second cellulosic plies comprise a plurality of individual layers.

31. The method as set forth in claim 29, wherein any of the first, second, and third cellulosic plies comprise a plurality of individual layers.

* * * * *